United States Patent
Chen et al.

(10) Patent No.: US 10,313,306 B2
(45) Date of Patent: *Jun. 4, 2019

(54) BROADBAND ACCESS FOR VIRTUAL PRIVATE NETWORKS

(71) Applicant: Marlow Technologies, LLC, Wilmington, DE (US)

(72) Inventors: Weijing Chen, Austin, TX (US); Keith Joseph Allen, Austin, TX (US)

(73) Assignee: Marlow Technologies, LLC, Wilmington, DE (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/263,597

(22) Filed: Sep. 13, 2016

(65) Prior Publication Data
US 2016/0380974 A1    Dec. 29, 2016

Related U.S. Application Data

(63) Continuation of application No. 14/604,161, filed on Jan. 23, 2015, now Pat. No. 9,467,373, which is a
(Continued)

(51) Int. Cl.
*H04L 12/18* (2006.01)
*H04L 29/06* (2006.01)
(Continued)

(52) U.S. Cl.
CPC .......... *H04L 63/0272* (2013.01); *H04L 12/46* (2013.01); *H04L 12/4641* (2013.01);
(Continued)

(58) Field of Classification Search
CPC ..... H04L 63/0272; H04L 63/08; H04L 69/22; H04L 65/4076; H04L 49/354; H04L 45/74; H04L 12/4641; H04L 12/46
(Continued)

(56) References Cited

U.S. PATENT DOCUMENTS

| 5,491,800 | A | 2/1996 | Goldsmith et al. |
| 5,600,644 | A | 2/1997 | Chang et al. |

(Continued)

FOREIGN PATENT DOCUMENTS

| EP | 1 036 450 | 9/2000 |
| WO | 99/29137 | 6/1999 |

(Continued)

OTHER PUBLICATIONS

"An Overview of ATM," downloaded from the internet at rware.demon.co.uk/atm.htm (1999).
(Continued)

*Primary Examiner* — Mohammed Waliullah
(74) *Attorney, Agent, or Firm* — Volpe and Koenig, P.C.

(57) ABSTRACT

An apparatus receives an upper layer packet that includes data from a source device, a virtual private network (VPN) identification, a destination address, and a destination option type. The apparatus authenticates the upper layer packet by comparing the VPN identification of the received upper layer packet to a customer VPN identification. The apparatus determines whether the apparatus recognizes the destination option type of the upper layer packet. The apparatus discards the upper layer packet on a condition that the apparatus does not recognize the destination option type. The apparatus decapsulates the upper layer packet into a lower layer packet and transmits the decapsulated packet to a destination on a condition that the apparatus recognizes the destination option type.

19 Claims, 2 Drawing Sheets

Related U.S. Application Data continuation of application No. 13/951,867, filed on Jul. 26, 2013, now Pat. No. 8,942,240, which is a continuation of application No. 13/542,724, filed on Jul. 6, 2012, now Pat. No. 8,520,681, which is a continuation of application No. 12/246,025, filed on Oct. 6, 2008, now Pat. No. 8,243,732, which is a continuation of application No. 10/628,238, filed on Jul. 29, 2003, now Pat. No. 7,447,203.

(51) Int. Cl.
| | |
|---|---|
| H04L 12/46 | (2006.01) |
| H04L 12/741 | (2013.01) |
| H04L 12/931 | (2013.01) |

(52) U.S. Cl.
CPC ............ *H04L 45/74* (2013.01); *H04L 49/354* (2013.01); *H04L 63/08* (2013.01); *H04L 65/4076* (2013.01); *H04L 69/22* (2013.01)

(58) Field of Classification Search
USPC .......................................................... 726/6
See application file for complete search history.

(56) References Cited

U.S. PATENT DOCUMENTS

| | | |
|---|---|---|
| 5,633,869 A | 5/1997 | Burnett et al. |
| 5,737,333 A | 4/1998 | Civanlar et al. |
| 5,757,796 A | 5/1998 | Hebb |
| 5,768,271 A | 6/1998 | Seid et al. |
| 5,781,529 A | 7/1998 | Liang et al. |
| 5,809,025 A | 9/1998 | Timbs |
| 5,828,844 A | 10/1998 | Civanlar et al. |
| 5,835,710 A | 11/1998 | Nagami et al. |
| 5,892,763 A | 4/1999 | Laraqui et al. |
| 5,903,559 A | 5/1999 | Acharya et al. |
| 5,930,477 A | 7/1999 | Uchida |
| 5,936,959 A | 8/1999 | Joffe |
| 5,940,394 A | 8/1999 | Killian |
| 5,940,396 A | 8/1999 | Rochberger |
| 5,946,313 A | 8/1999 | Allan et al. |
| 5,949,782 A | 9/1999 | Wells |
| 5,958,018 A | 9/1999 | Eng et al. |
| 5,983,332 A | 11/1999 | Watkins |
| 5,991,300 A | 11/1999 | Tappan |
| 5,991,854 A | 11/1999 | Watkins |
| 6,016,319 A | 1/2000 | Kshirsagar et al. |
| 6,021,263 A | 2/2000 | Kujoory et al. |
| 6,034,958 A | 3/2000 | Wicklung et al. |
| 6,055,236 A | 4/2000 | Nessett |
| 6,078,586 A | 6/2000 | Dugan et al. |
| 6,081,836 A | 6/2000 | Karapetkov et al. |
| 6,085,238 A | 7/2000 | Yuasa et al. |
| 6,101,188 A | 8/2000 | Sekine et al. |
| 6,111,881 A | 8/2000 | Soncodi |
| 6,122,670 A | 9/2000 | Bennett et al. |
| 6,137,800 A | 10/2000 | Wiley et al. |
| 6,138,144 A | 10/2000 | DeSimone et al. |
| 6,147,993 A | 11/2000 | Kloth et al. |
| 6,151,297 A | 11/2000 | Congdon et al. |
| 6,172,981 B1 | 1/2001 | Cox et al. |
| 6,188,689 B1 | 2/2001 | Katsube et al. |
| 6,195,364 B1 | 2/2001 | Brodigan |
| 6,222,842 B1 | 4/2001 | Sasyan et al. |
| 6,252,857 B1 | 6/2001 | Fendick et al. |
| 6,314,098 B1 | 11/2001 | Masuda et al. |
| 6,343,322 B2 | 1/2002 | Nagami et al. |
| 6,343,326 B2 | 1/2002 | Acharya et al. |
| 6,345,051 B1 | 2/2002 | Gupta et al. |
| 6,385,170 B1 | 5/2002 | Chiu et al. |
| 6,456,962 B1 | 9/2002 | Allingham et al. |
| 6,459,682 B1 | 10/2002 | Elleson et al. |
| 6,469,983 B2 | 10/2002 | Narayama et al. |
| 6,470,389 B1 | 10/2002 | Chung et al. |
| 6,484,210 B1 | 11/2002 | Adriano et al. |
| 6,496,479 B1 | 12/2002 | Shionozaki et al. |
| 6,501,760 B1 | 12/2002 | Ohba et al. |
| 6,516,417 B1 | 2/2003 | Pegrum et al. |
| 6,523,068 B1 | 2/2003 | Beser et al. |
| 6,538,416 B1 | 3/2003 | Hahne et al. |
| 6,563,794 B1 | 5/2003 | Takashima et al. |
| 6,587,466 B1 | 7/2003 | Bhattacharya et al. |
| 6,598,080 B1 | 7/2003 | Nagami et al. |
| 6,614,791 B1 | 9/2003 | Luciani et al. |
| 6,625,124 B1 | 9/2003 | Fan et al. |
| 6,636,516 B1 | 10/2003 | Yamano |
| 6,643,287 B1 | 11/2003 | Callon et al. |
| 6,697,352 B1 | 2/2004 | Ludwig et al. |
| 6,751,218 B1 | 6/2004 | Hagirahim et al. |
| 6,771,673 B1 | 8/2004 | Baum et al. |
| 6,788,681 B1 | 9/2004 | Hurren et al. |
| 6,789,121 B2 | 9/2004 | Lamberton et al. |
| 6,798,782 B1 | 9/2004 | Caronni et al. |
| 6,937,574 B1 | 8/2005 | Delaney et al. |
| 6,967,954 B2 | 11/2005 | Sugiyama |
| 6,985,488 B2 | 1/2006 | Pan et al. |
| 6,993,026 B1 | 1/2006 | Baum et al. |
| 7,002,936 B2 | 2/2006 | Agrawal et al. |
| 7,012,919 B1 | 3/2006 | So et al. |
| 7,110,375 B2 | 9/2006 | Khalil et al. |
| 7,136,374 B1 | 11/2006 | Kompella |
| 7,149,225 B2 | 12/2006 | Thubert et al. |
| 7,162,529 B2 | 1/2007 | Morishige et al. |
| 7,164,658 B1 | 1/2007 | Shenoy et al. |
| 7,177,952 B1 | 2/2007 | Wurch et al. |
| 7,181,017 B1 | 2/2007 | Nagel et al. |
| 7,203,195 B2 | 4/2007 | Hidaka et al. |
| 7,246,175 B1 | 7/2007 | Tappan et al. |
| 7,260,840 B2 | 8/2007 | Swander et al. |
| 7,310,356 B2 | 12/2007 | Abdo et al. |
| 7,315,554 B2 | 1/2008 | Baum et al. |
| 7,327,722 B1 | 2/2008 | Pipher et al. |
| 7,369,556 B1 | 5/2008 | Rekhter et al. |
| 7,398,322 B1 | 7/2008 | Perlman |
| 7,417,950 B2 | 8/2008 | Hofmeister et al. |
| 7,440,405 B2 | 10/2008 | Hsieh et al. |
| 7,453,852 B2 | 11/2008 | Buddhikot et al. |
| 7,463,639 B1 | 12/2008 | Rekhter |
| 7,477,657 B1 | 1/2009 | Murphy et al. |
| 7,480,312 B2 | 1/2009 | Ossman |
| 7,499,450 B2 | 3/2009 | Foglar et al. |
| 7,519,056 B2 | 4/2009 | Ishwar et al. |
| 7,529,243 B2 | 5/2009 | Sodder et al. |
| 7,555,562 B2 | 6/2009 | See et al. |
| 7,596,101 B2 | 9/2009 | Oguchi |
| 7,768,993 B2 | 8/2010 | Giese et al. |
| 7,881,311 B2 | 2/2011 | Sakamoto et al. |
| 7,961,884 B2 | 6/2011 | Edgett et al. |
| 7,983,286 B2 | 7/2011 | Rekhter |
| 8,718,057 B1 | 5/2014 | Rabie et al. |
| 2001/0005381 A1* | 6/2001 | Sugiyama .......... H04Q 11/0478 370/466 |
| 2001/0016914 A1* | 8/2001 | Tabata ................ H04L 63/0272 726/15 |
| 2001/0048686 A1* | 12/2001 | Takeda .................... H04L 12/66 370/401 |
| 2002/0013844 A1 | 1/2002 | Garrett et al. |
| 2002/0018456 A1 | 2/2002 | Kakemizu et al. |
| 2002/0038419 A1 | 3/2002 | Garrett et al. |
| 2002/0061011 A1 | 5/2002 | Wan |
| 2002/0085565 A1 | 7/2002 | Ku et al. |
| 2002/0085567 A1 | 7/2002 | Ku et al. |
| 2002/0132636 A1 | 9/2002 | Stockhusen |
| 2002/0133534 A1 | 9/2002 | Forslow |
| 2002/0141369 A1 | 10/2002 | Perras |
| 2002/0196793 A1 | 12/2002 | Samba et al. |
| 2003/0028671 A1 | 2/2003 | Mehta et al. |
| 2003/0048804 A1 | 3/2003 | Inouchi et al. |
| 2003/0058827 A1 | 3/2003 | Chow et al. |
| 2003/0067934 A1 | 4/2003 | Hooper et al. |
| 2003/0074469 A1 | 4/2003 | Busi et al. |
| 2003/0076854 A1 | 4/2003 | Mudhar et al. |
| 2003/0088696 A1 | 5/2003 | McCanne |

(56) References Cited

U.S. PATENT DOCUMENTS

| | | | |
|---|---|---|---|
| 2003/0088697 | A1 | 5/2003 | Matsuhira |
| 2003/0110268 | A1 | 6/2003 | Kermarec et al. |
| 2003/0115480 | A1 | 6/2003 | McDysan |
| 2003/0133451 | A1 | 7/2003 | Mahalingaiah |
| 2003/0142669 | A1 | 7/2003 | Kubota et al. |
| 2003/0154259 | A1 | 8/2003 | Lamberton et al. |
| 2003/0169767 | A1 | 9/2003 | Christie et al. |
| 2003/0174715 | A1 | 9/2003 | Yazaki |
| 2003/0189930 | A1 | 10/2003 | Terrell et al. |
| 2003/0210686 | A1 | 11/2003 | Terrell et al. |
| 2003/0217046 | A1 | 11/2003 | Yuan et al. |
| 2004/0005039 | A1 | 1/2004 | White et al. |
| 2004/0013130 | A1 | 1/2004 | Blanchet et al. |
| 2004/0037296 | A1 | 2/2004 | Kim et al. |
| 2004/0071164 | A1 | 4/2004 | Baum |
| 2004/0088542 | A1 | 5/2004 | Daude et al. |
| 2004/0105459 | A1 | 6/2004 | Mannam |
| 2004/0111640 | A1 | 6/2004 | Baum |
| 2004/0143758 | A1 | 7/2004 | Swander et al. |
| 2004/0160903 | A1 | 8/2004 | Gai et al. |
| 2004/0202171 | A1 | 10/2004 | Hama |
| 2004/0202199 | A1 | 10/2004 | Fischer et al. |
| 2005/0010690 | A1 | 1/2005 | Marshall et al. |
| 2006/0013209 | A1* | 1/2006 | Somasundaram .. H04L 12/4675 370/389 |
| 2006/0126659 | A1 | 6/2006 | Baum et al. |
| 2009/0085567 | A1 | 4/2009 | Kimmlingen et al. |
| 2009/0168776 | A1 | 7/2009 | Baum et al. |
| 2009/0316704 | A1 | 12/2009 | Sodder et al. |

FOREIGN PATENT DOCUMENTS

| | | |
|---|---|---|
| WO | 00/57296 | 9/2000 |
| WO | 00/76122 | 12/2000 |
| WO | 01/11837 | 2/2001 |
| WO | 01/31829 | 5/2001 |

OTHER PUBLICATIONS

"RSVP-ATM QoS ATM Interworking," Cisco IOS Release 12.0 (3), pp. 1-34 (2001).
Allen et al., "IPv6 for Large Access Providers" (Oct. 2002).
ATM Bi-level Addressing Document, Version 1.0 (Draft), (STR-RA-ADDR-01.00, The ATM Forum Technical Committee (Jul. 2000).
ATM Bi-level Addressing Document, Version 1.0, (STR-RA-ADDR-01.00, The ATM Forum Technical Committee (Jul. 2000).
ATM Forum Addressing: Reference Guide (AF-RA-0106.000, The ATM Forum Technical Committee, (Feb. 1999).
ATM Forum Addressing: User Guide version 1.0 (AF-RA-0115. 000), The ATM Forum Technical Committee, (Jan. 1999).
ATM Name System V2.0 Baseline Text (BTD-SAA-ANS-02.01), The ATM Forum Technical Committee, (Jul. 1999).
Berger, "RSVP Over ATM Implementation Requirements," Fore Systems, downloaded from the internet at ftp.isi.edu/in-notes/rfc2380. txt (Aug. 1998).
Cisco Systems, Inc., "Resource Reservation Protocol," downloaded from the internet at cisco.com/univercd/cc/td/doc/cisintwk/ito_doc/rsvp.htm (Feb. 2002).
Crowcroft et al., "QoS Trilas on SuperJANET in the Context of HICID and Other BT/JISC Project," downloaded from the internet at cs.ucl.ac.uk/research/hicid/jisc-anc.htm (Nov. 1997).
Deering et al., "Internet Protocol, Version 6 (IPv6) Specification," Network Working Group, Request for Comments: 2460 (Dec. 1998).

Final Rejection, U.S. Appl. No. 10/628,238, dated Mar. 10, 2008.
Final Rejection, U.S. Appl. No. 12/246,025, dated Aug. 10, 2010.
Final Rejection, U.S. Appl. No. 12/246,025, dated Jan. 17, 2012.
Final Rejection, U.S. Appl. No. 12/246,025, dated Mar. 3, 2011.
Final Rejection, U.S. Appl. No. 14/604,161, dated Nov. 17, 2015.
Handley et al., "The Internet Multimedia Conferencing Architecture," pp. 1-13, downloaded from the internet at isoc.org/inet96/proceedings (Jun. 1996).
New Capabilities ATM Addressing Document (Draft) (BTD-RA-ADDR-02.03), the Atm Forum Technical Committee, (Oct. 1998).
Non-Final Rejection, U.S. Appl. No. 10/628,238, dated Apr. 4, 2007.
Non-Final Rejection, U.S. Appl. No. 10/628,238, dated Aug. 3, 2007.
Non-Final Rejection, U.S. Appl. No. 10/628,238, dated Oct. 4, 2007.
Non-Final Rejection, U.S. Appl. No. 12/246,025, dated Mar. 1, 2010.
Non-Final Rejection, U.S. Appl. No. 12/246,025, dated Sep. 15, 2010.
Non-Final Rejection, U.S. Appl. No. 12/246,025, dated Jul. 4, 2011.
Non-Final Rejection, U.S. Appl. No. 13/542,724, dated Jan. 14, 2013.
Non-Final Rejection, U.S. Appl. No. 13/951,867, dated Feb. 27, 2014.
Non-Final Rejection, U.S. Appl. No. 13/951,867, dated May 27, 2014.
Non-Final Rejection, U.S. Appl. No. 14/604,161, dated Jun. 18, 2015.
Notice of Allowance, U.S. Appl. No. 10/628,238, dated Aug. 11, 2008.
Notice of Allowance, U.S. Appl. No. 12/246,025, dated May 1, 2012.
Notice of Allowance, U.S. Appl. No. 13/542,724, dated Apr. 29, 2013.
Notice of Allowance, U.S. Appl. No. 13/951,867, dated Sep. 10, 2014.
Notice of Allowance, U.S. Appl. No. 14/604,161, dated Jun. 9, 2016.
PNNI Transported Address Stack version 1.0 (AF-CS-0115.000), The ATM Forum Technical Committee, (May 1999).
SBC Communications, Inc., "Extensions to RSVP for QoS IP Over Signaled QoS Network," downloaded from the internet at ietf.org/internet-drafts/draft-weijing-rsvp-sqn-00.tex (Apr. 2002).
Specification for RFC 1034, entitled, "Domain Names-Concepts and Facilities," (Nov. 1987).
Specification for RFC 1035, entitled: Domain Names-Implementation and Specification (Nov. 1987).
Specification for RFC 1995, entitled, Incremental Zone Transfer in DNS (Aug. 1996).
Specification for RFC 1996, entitled, "A Mechanism for Prompt Notification of Zone Changes (DNS Notify)" (Aug. 1996).
Specification for RFC 2065, entitled: Domain Name System Security Extensions (Jan. 1997).
Specification for RFC 2136, entitled, "Dynamic Updated in the Domain Names System (DNS Update)," (Apr. 1997).
Specification for RFC 2137, entitled, "Secure Domain Name System Dynamic Update," (Apr. 1997).
WAN, "ASP Bi-level Addressing and ANS Requirements," (99-0534) (Sep. 1999).
WAN, "ASP Bi-level Addressing Architecture," (99-0649) (Nov. 1999).

* cited by examiner

BROADBAND ACCESS FOR VIRTUAL PRIVATE NETWORKS

CROSS REFERENCE TO RELATED APPLICATIONS

This application is a continuation of U.S. patent application Ser. No. 14/604,161, filed Jan. 23, 2015, which is a continuation of U.S. patent application Ser. No. 13/951,867, filed Jul. 26, 2013, now U.S. Pat. No. 8,942,240, which issued on Jan. 27, 2015, which is a continuation of U.S. patent application Ser. No. 13/542,724, filed on Jul. 6, 2012, now U.S. Pat. No. 8,520,681, which issued on Aug. 27, 2013, which is a continuation of U.S. patent application Ser. No. 12/246,025, filed on Oct. 6, 2008, now U.S. Pat. No. 8,243,732, which issued on Aug. 14, 2012, which is a continuation of U.S. patent application Ser. No. 10/628,238, filed on Jul. 29, 2003, now U.S. Pat. No. 7,447,203, which issued on Nov. 4, 2008, all of which are expressly incorporated herein by reference in their entireties.

BACKGROUND OF THE INVENTION

1. Field of the Invention

The present invention relates to the field of telecommunications. More particularly, the present invention relates to using an Internet protocol (IP) network of a telecommunications service provider to provide virtual private network (VPN) functionality among local area networks (LANs).

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:
Address Resolution Protocol (ARP)
Asynchronous Transfer Mode (ATM)
Digital Subscriber Line (DSL)
Digital Subscriber Line Access Multiplexer (DSLAM)
Internet Protocol (IP)
Internet Protocol Version 4 (IPv4)
Internet Protocol Version 6 (IPv6)
Internet Service Provider (ISP)
Local Area Network (LAN)
Media Access Control (MAC)
Multi-Protocol Label Switching (MPLS)
Point-to-Point Protocol (PPP)
Personal Digital Assistant (PDA)
Request for Comment (RFC)
Telecommunications Service Provider (TSP)
Transmission Control Protocol (TCP)
User Datagram Protocol (UDP)
Virtual Local Area Network (VLAN)
Virtual Private Network (VPN)
Wide Area Network (WAN)

3. Background and Material Information

A virtual private network (VPN) is a non-public network that runs over a shared network infrastructure, such as the public Internet. A VPN enables interconnection among distinct networks, including local area networks (LANs), and other end-systems over a wide area network (WAN). The VPN provides security to the extent that it recognizes and transports only data associated with end-systems that are part of the network.

A virtual local area network (VLAN) provides logical grouping and networking of various customer end-systems, such as work stations, user devices, private networks, and the like, as though they are grouped on the same physical LAN. In other words, the VLAN associates end-systems based on criteria other than the physical location of the end-systems. For example, the VLAN can provide network services to a customer having multiple geographic locations, or to a department within a customer organization remotely located throughout a campus environment.

A VLAN VPN implemented over a WAN is provided by a telecommunications service provider (TSP) to interconnect the LANs as if they were one. Typically, TSPs rely on network connections to provide customers VPN service, including multi-protocol label switching (MPLS) paths, asynchronous transfer mode (ATM) circuits and point-to-point protocol (PPP) connections. However, connection oriented implementations inhibit efficient execution of VPN services and have limited scalability, as well as flexibility.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
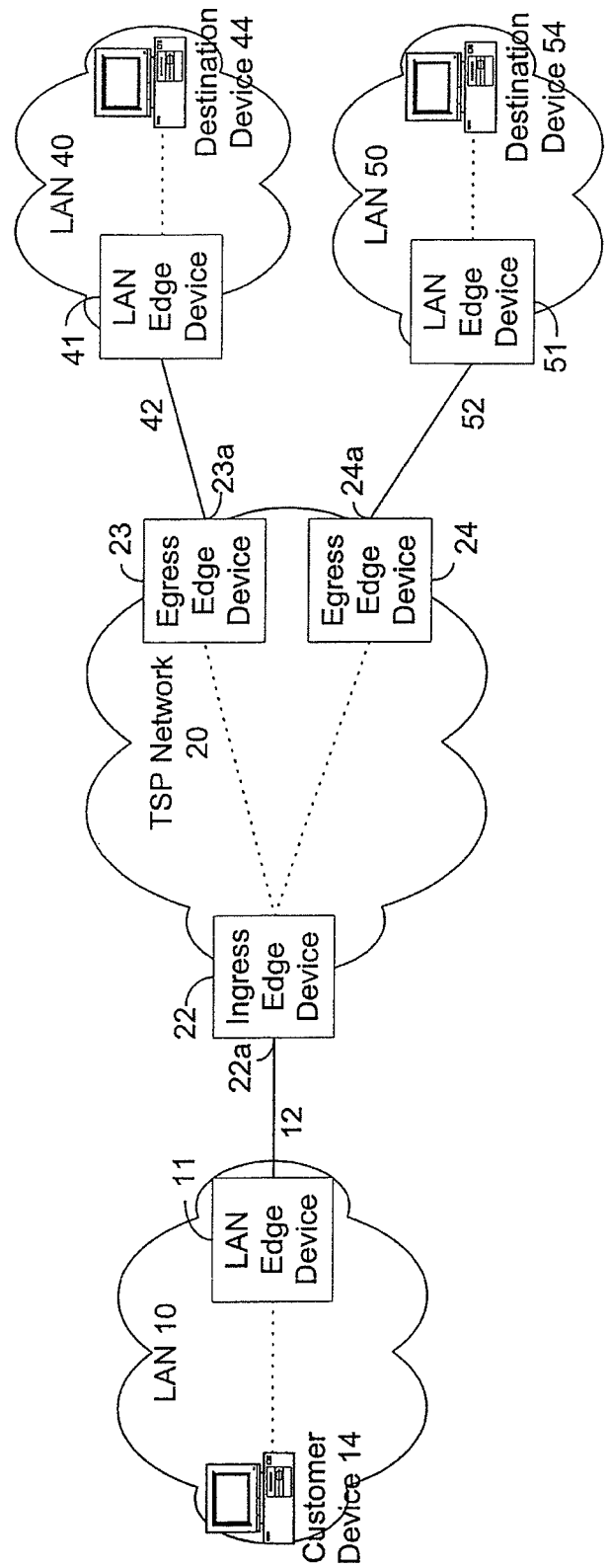
FIG. 1 is a diagram showing an exemplary network architecture, according to an aspect of the present invention.

The present invention incorporates an Internet protocol, version 6 (IPv6) network to provide a connectionless approach to implementing VLAN VPNs among various LANs. Generally, the invention enables broadband access to the IPv6 network of a telecommunications service provider (TSP) by emulating layer two (e.g., Ethernet) functionality while performing layer three (e.g., IP) routing through a WAN. For example, a user operating within an originating LAN of a VPN may access the IPv6 TSP network from either a IPv4 or an IPv6 originating device by encapsulating each frame in an IPv6 packet, together with a unique VPN identification number, at an ingress line interface of the TSP network. The LAN frames include, for example, Ethernet frames, media access control (MAC) frames, other layer two frames and the like. The IPv6 packet is routed through the TSP network to an egress line interface associated with the destination LAN within the same VPN. The egress line interface verifies the VPN identification number and, upon verification, decapsulates the IPv6 packet and transmits the LAN frame to the destination LAN. Use of the IPv6 TSP network is a scalable and more manageable alternative to current MPLS networks, for example.

In view of the above, the present invention through one or more of its various aspects and/or embodiments is presented to accomplish one or more objectives and advantages, such as those noted below.

An aspect of the present invention provides a method for sending data through a provider network from an originating network to a destination network in a VPN. The method includes encapsulating data link layer data from the originating network in a network layer packet and determining whether a data link layer address of a destination device in the destination network is mapped to a network layer address of an egress line interface in the provider network. When the destination device address is not mapped to the egress line interface address, the network layer packet is broadcast to a multicast address associated with the VPN. When the destination device address is mapped to the egress line interface address, based on a previous transmission from the destination device, the network layer packet is unicast to the egress line interface address.

A VPN identification number corresponding to the VPN may be added to the network layer packet. The VPN identification number is verified after the egress line interface receives the network layer packet. The data layer link data is decapsulated from the network layer packet only when the VPN identification number is verified.

Another aspect of the present invention provides a method for providing broadband access to a VPN, which includes multiple LANs configured to interface with an IPv6 service provider network through broadband access links. The method includes encapsulating a LAN frame from an originating LAN of the VPN in an IPv6 packet of the service provider network; adding a VPN identification number corresponding to the VPN to the IPv6 packet; and routing the IPv6 packet through the service provider network. The LAN frame is decapsulated when the VPN identification number is verified. The decapsulated LAN frame is transmitted to the destination LAN. The IPv6 packet is discarded when the VPN identification number is not verified. The IPv6 packet includes an IPv6 address of an ingress line interface, which receives the LAN frame, as a source address and an IPv6 address of an egress line interface, to which the IPv6 packet is routed for verification, as a destination address.

The IPv6 packet may include the VPN identification number in an optional header extension. For example, the VPN identification number may be included in a multiple of four octets of the optional header extension. The optional header extension may further identify a destination option type, in which case the method further includes discarding the IPv6 packet when the egress line interface does not recognize the destination option type in the optional header extension. The optional header extension may further identify a VPN hop number, which indicates a number of line interfaces that transmit the IPv6 packet.

It is determined whether an address of a destination device in the destination LAN is mapped to the egress line interface. When the address is not mapped to the egress line interface, the IPv6 packet is broadcast to a multicast address associated with the VPN and the IPv6 packet is received at the egress line interface based on the multicast address. An address of the egress line interface is mapped to the address of the destination device, based on address information received by the ingress line interface in a transmission from the destination device. Subsequent IPv6 packets are then transmitted to the destination device using a unicast address of the egress line interface based on the mapping.

Another aspect of the present invention provides a system for providing broadband access to a VPN, which includes multiple LANs configured to interface with an IPv6 service provider network. The system includes multiple interface devices in the service provider network. Each interface device includes at least one line interface, each of which is connectable to at least one of the LANs through a broadband access link. A first interface device receives a LAN frame from a first LAN at an ingress line interface corresponding to the first LAN, encapsulates the LAN frame in an IPv6 packet, and adds a VPN identification number corresponding to the VPN to the IPv6 packet. The LAN frame is directed to a second LAN. A second interface device receives the IPv6 packet at an egress line interface corresponding to the second LAN, verifies the VPN identification number, decapsulates the LAN frame when the VPN identification number is verified, and transmits the LAN frame to the second LAN. The second interface device discards the IPv6 packet when it is not able to verify the VPN identification number.

The IPv6 packet includes the VPN identification number in an optional header extension. The first interface device may further include an ingress virtual bridge corresponding to the ingress line interface. When the ingress virtual bridge is not able to associate an address of a destination device in the second LAN with an address of the egress line interface of the second interface device, the first interface device broadcasts the IPv6 packet to a multicast address associated with the VPN. The second interface device receives the IPv6 packet at the egress line interface based on the multicast address. The second interface device may further include an egress virtual bridge corresponding to the egress line interface. The egress virtual bridge then maps an address of an originating device in the first LAN with the address of the ingress line interface after the second interface device receives the broadcast IPv6 packet. The second interface device is able to unicast subsequent IPv6 packets, directed to the originating device, to the address of the ingress line interface based on the mapping.

Yet another aspect of the present invention provides a method of providing broadband access for a customer in a VPN, including multiple LANs interfacing with at least one TSP network. Each TSP network includes multiple interfaces corresponding to the multiple LANs. The method includes assigning a unique VPN identification number to the customer and assigning a common multicast address to the interfaces and a unique unicast address to each of the interfaces. Data from an originating LAN is received, the data being directed to a destination device in a destination LAN. The originating LAN corresponds to an ingress interface of the interfaces and the destination LAN corresponds to an egress interface of the interfaces. When an address of the destination device address is not mapped to the destination LAN, the data is encapsulated in a multicast packet, having the unique address of the ingress interface as a source address and the multicast address as a destination address. The encapsulated data is transmitted to all interfaces corresponding to the LANs based on the multicast address. The frame is decapsulated only at the egress interface, which forwards the frame to the destination device.

The destination device address may be mapped to the IPv6 address of the egress interface based on address information previously received by the ingress interface from the destination device. When the destination device address is mapped to the egress interface, the data is encapsulated in a unicast packet having the unique IPv6 address of the ingress interface as the source address and the unique address of the egress interface as the destination address. The encapsulated frame is then transmitted only to the egress interface, based on the destination address in the unicast packet. The VPN identification number may be entered in the multicast packet and/or the unicast packet. The reading the VPN identification is read at the egress interface to verify that the received packet is associated with the VPN.

The various aspects and embodiments of the present invention are described in detail below.

The present invention is directed to enabling TSPs to provide IP broadband network services over packet switched data networks having expanded capacity, such as IPv6 networks. IPv6 networks are capable of serving mass-market IP broadband access subscribers, as well as accommodating business customers to manage their data communication services in-house. VLAN VPN is one service that enables the broadband access and management control desired.

FIG. 1 is a diagram depicting an exemplary network infrastructure supporting the present invention. FIG. 1, in particular, depicts a VLAN VPN of a customer, which includes multiple LANs 10, 40 and 50. In an embodiment of the invention, each LAN is an Ethernet LAN having user end-systems 14, 44 and 54 that interface with a TSP core network 20 through customer edge devices 11, 41 and 51, respectively. However, each of the LANs 10, 40 and 50 may be an IP network or other data network without departing from the spirit and scope of the present invention. As discussed above, the TSP network 20 is an IPv6 network, which allows static allocation of IPv6 addresses to uniquely identify the customers, due to the large address space of the IPv6 format. The TSP IPv6 network 20 is essentially configured such that it appears to be a wide-area LAN to the VLAN VPN customer.

The LANs 10, 40 and 50, depicted in the exemplary embodiment of the invention, provide layer two (i.e., data link layer) network functionality. Layer two functionality generally includes handling physical and logical connections to the Ethernet or other LAN frame (or packet) destinations. The user devices, such as customer devices 14, 44 and 54, are addressed and identified using unique MAC addresses corresponding to each device. The data link layer protocol specifies the MAC address of each frame's source and destination.

The TSP network 20, depicted in the exemplary embodiment of the invention, provides layer three (i.e., network layer) functionality. The network layer routes packets (or datagrams) from one network to another. Internet protocol, in particular, identifies each IP device with a unique IP address, including, for example, the edge devices 22, 23 and 24 and/or the various line interfaces 22a, 23a and 24a, discussed below. In the depicted embodiment of the present invention, each IP address is an IPv6 address allocated by the TSP network 20. The IP packets are routed through the TSP network 20 in accordance with IP (e.g., IPv6), while the layer four (i.e., transport layer) protocols, such as transmission control protocol (TCP) and user datagram protocol (UDP) for transmission control, continue to be supported with no change.

The originating customer device 14 is depicted as part of the originating LAN 10. Each of the LANs 10, 40 and 50 may include any number and type of IP compatible networked devices, including, for example, a personal computer, a laptop computer, a personal digital assistant (PDA), a voice over IP telephone, or the like. The originating customer device 14 communicates through the LAN 10 with the customer edge device 11. The customer edge device 11 likewise is any interface device capable of communicating with the TSP network 20, such as an Ethernet switch or an IP router with an Ethernet interface, depending on the type of customer network.

The customer edge device 11 accesses an ingress router 22 of the TSP network 20 over a broadband access link 12. In an embodiment of the invention, the broadband access link 12 is a digital subscriber line (DSL), and therefore includes a DSL access multiplexer (DSLAM), an asynchronous transfer mode (ATM) edge switch and an interworking function device (not pictured), for example. Alternatively, the broadband access link 12 may include digital cable, T-1, digital signal-level 3 (DS-3) or optical carrier-level 3 (OC-3) interfaces, or an Ethernet. The broadband access links 12, 42 and 52 of the various LANs in the VPN do not need to be the same type.

The TSP network 20 includes multiple edge devices (i.e., gateways) 22, 23 and 24, which may be IPv6 routers or switches having Ethernet bridging functionality, for example. Each edge device 22, 23 and 24 has multiple line interfaces, which correspond to the various customer LANs and interface the edge devices with the customer LANs, including depicted line interfaces 22a, 23a and 24a. It is understood that each edge device 22, 23 and 24 is configured with multiple line interfaces, even though FIG. 1 depicts only one corresponding line interface 22a, 23a and 24a for each. The multiple line interfaces enable each edge device 22, 23 and 24 to simultaneously service multiple VPNs and LANs.

Typically, each customer device 14, 44 and 54 corresponds to a single line interface (e.g., line interfaces 22a, 23a and 24a), although alternative embodiments of the invention include multiple interfaces for a single customer device 14, 44 and 54. As discussed below, each line interface 22a, 23a and 24a is associated with a virtual learning bridge, which learns and caches mapping of customer devices 14, 44 and 54 with their associated line interfaces 22a, 23a and 24a. The TSP network 20 is thus able to more efficiently route communications among the LANs in the VPN over time.

The exemplary network architecture of FIG. 1 depicts an ingress edge device 22, which interfaces with the broadband access link 12 of the originating LAN 10 through an ingress line interface 22a. In addition to the ingress edge device 22, FIG. 1 depicts two egress edge devices 23 and 24. Egress edge device 23 interfaces with the broadband access link 42 of the destination LAN 40 through an egress line interface 23a, and the egress edge device 24 interfaces with the broadband access link 52 of the destination LAN 50 through an egress line interface 24a. Each of the LANs 40 and 50 respectively include at least one destination device 44 and 54 of the customer, which may be any of the types of devices described above with respect to the originating customer device 14 of LAN 10. It is understood that all of the exemplary customer devices and corresponding edge devices depicted in FIG. 1 are capable of sending and receiving data through the VPN, and are described as originating or destination devices only to facilitate description of the various embodiments of the invention.

Figure 2:
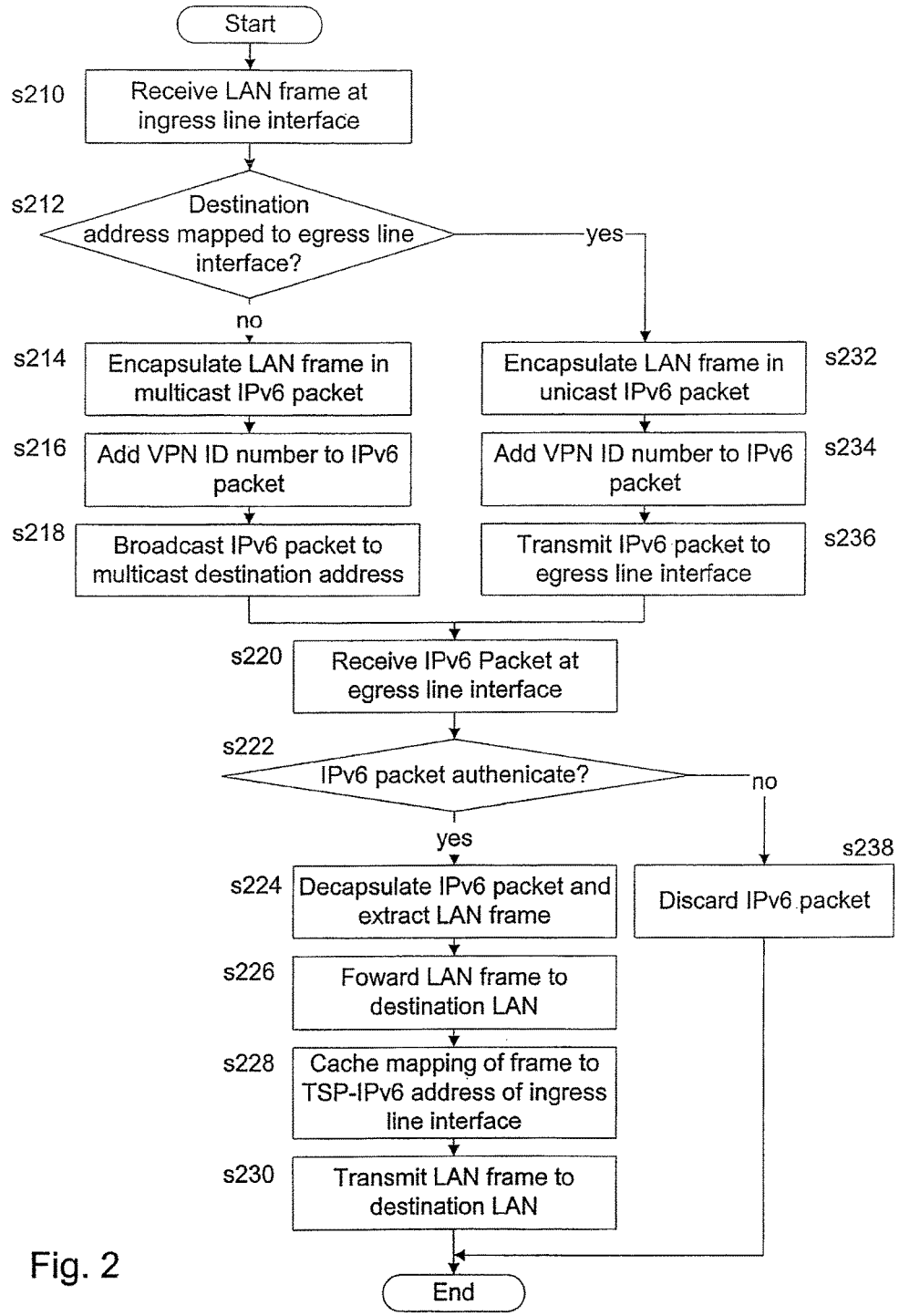
FIG. 2 is a flow diagram illustrating IP broadband access from an originating LAN, according to an aspect of the present invention.

IPv6 packets are routed through the TSP network 20 to one of the egress edge devices 23 or 24, depending on the destination address of each IPv6 packet sent from the ingress edge device 22. For example, an Ethernet frame from the customer device 14 destined for the destination device 44 in LAN 40 is encapsulated in an IPv6 packet having the IP address of the egress line interface 23a as the destination address. As described in detail with respect to FIG. 2, when the egress line interface associated with the destination device and/or the destination LAN is not known, the ingress edge device 22 multicasts the IPv6 packet to the other edge devices serving the VLAN VPN so that all potential egress edge devices, including the egress edge devices 23 and 24, receive the packet. Only the egress edge device having the egress line interface that services the destination LAN (e.g., the egress edge device 23 and associated egress line interface 23a) responds to the broadcast IPv6 packet, enabling unicast transmission of subsequent packets from the ingress edge device 22. In alternative embodiments of the invention, the broadcast comprises a modified address resolution protocol (ARP) message and the encapsulation and decapsulation is performed by the customer edge devices 11 and 41. The addressing and transmitting processes are described in detail with respect to FIG. 2, below.

In an embodiment of the invention, the customer subscribes to a VLAN VPN service having IP broadband connectivity with the TSP network 20 from multiple sites or locations. The customer's VLAN VPN is assigned a unique VPN identification number, which is four or more bytes, for example. In alternative embodiments of the invention, the unique VPN identification number is an IPv6 address prefix under control of the TSP or an identification number allocated from a dedicated, separate address space of the TSP network 20. The VPN identification number assigned to the customer is included with the VPN interface configuration. The VPN identification number distinguishes data packets associated with the customer's VLAN VPN from other VLAN VPNs supported by the TSP network 20.

Each of the line interfaces 22a, 23a and 24a depicted in the TSP network 20 is allocated unique IPv6 address (TSP-IPv6) from an IPv6 address block of the TSP network 20. As explained above, the line interfaces 22a, 23a and 24a and associated TSP-IPv6 addresses correspond to particular LANs of the customer's VPN. The line interfaces 22a, 23a and 24a are also assigned a VLAN VPN specific IPv6 multicast address (TSP-MIPv6) from the TSP's IPv6 address block, associated with the customer's VPN. A single multicast address may be used to multicast a packet to all of the interfaces serving a VLAN VPN. In an embodiment of the invention, the TSP-IPv6 and TSP-MIPv6 addresses are allocated or assigned to the line interfaces 22a, 23a and 24a manually, although any effective form of allocation or assignment may be incorporated without departing from the spirit and scope of the present invention. Generally, using the IPv6 and the MIPv6 addresses, the TSP network 20 is able to effectively provide layer two (e.g., Ethernet) capabilities to link customer edge devices 11, 41 and 51, while the customer performs its own layer three (e.g., IP) network administration.

As stated above, the ingress edge device 22 has virtual learning bridges corresponding to the line interfaces associated with every VLAN VPN that it serves, including the line interface 22a. When the virtual learning bridge receives an Ethernet frame from the originating VLAN 10, for example, it learns and caches identification information, such as an Ethernet MAC address and/or the LAN identification number (e.g., the 802.1q tag) of the originating customer device 14 from which the frame is sent. Therefore, the line interface 22a knows precisely where to forward frames that it subsequently receives, e.g., from the other line interfaces 23a and 24a, destined for the MAC address and/or the VLAN identification number of the originating customer device 14.

Similarly, the virtual learning bridge learns information that enables the line interface 22a to efficiently forward LAN frames that it receives from the originating customer device 14 to various destination devices, such as the destination customer devices 44 and 54. For example, referring to FIG. 2, the ingress line interface 22a receives a LAN frame from the originating customer device 14 over the broadband access link 12 at step s210. At step s212, the ingress line interface 22a determines whether the destination address (e.g., the address of the destination customer device 44) is already mapped to an egress line interface.

When mapping of the destination address to an egress line interface does not exist, for example, when the ingress line interface 22a has no record of transmitting a packet from the originating customer device 14 to the destination customer device 44 (or from the originating LAN 10 to the destination LAN 40), the ingress line interface 22a encapsulates the LAN frame in a multicast IPv6 packet at step s214. The multicast IPv6 packet includes the TSP IPv6 address of the ingress line interface 22a as the source address and the TSP-MIPv6 multicast address of the customer's VLAN VPN as the destination multicast address.

At step s216, the previously assigned VPN identification number is added to the header of the IPv6 packet in order to provide security for the VPN. Use of the VPN identification number prevents unsecured or unauthorized LAN frames from being delivered to VPN customers at the egress line interfaces 23a and 24a. Use of the VPN identification number is an improvement over security measures implemented in conventional VPNs, which typically require layered connections internal to the network, and a control plane consisting of virtual routers configured to exchange routing information. In an alternative embodiment, the customer edge device 11 adds the VPN identification number to the IPv6 packet header, and the ingress line interface 22a confirms it. The IPv6 packet, including the VPN identification number is transmitted through the TSP network 20 to the egress line interface 23a in the egress device 23 at step s220.

In an embodiment of the invention, an extension of the current IPv6 optional header is used to encapsulate the VPN identification number. The IPv6 header is implemented, for example, in accordance with RFC 2460, "Internet Protocol, Version 6 (IPv6) Specification" (December 1998), the content of which is expressly incorporated by reference herein in its entirety. The VPN identification number marks an IPv6 packet as belonging to a particular VLAN VPN. The VPN identification number header is a specific option of the more generic destination options header (e.g., header type 60) of the IPv6 protocol. An exemplary format of the optional header extension, including the VPN identification number header is as follows:

```
 31                  24 23          16 15         8 7          0
 +-+-+-+-+-+-+-+-+-+-+-+-+-+-+-+-+-+-+-+-+-+-+-+-+
                     |011| type = ? | length = 9 |   VPN hop  |
+----------------------------------------------------------------------------------+
|                                                                                  |
|                          VPN ID (8 octets)                                       |
+-+-+-+-+-+-+-+-+-+-+-+-+-+-+-+-+-+-+-+-+-+-+-+-+-+-+-+-+-+-+-+-+
```

The first three bits of the first octet are 011, as shown above. The remaining five bits comprise the destination option type number. The value of 011 indicates that nodes not recognizing this option type should discard the packet and that the option data (i.e., the VPN hop count) may change en route. Discarding the packet ensures that any packet delivered to a node not capable of processing VPN headers will not be inadvertently delivered to a site outside of the VPN. The VPN hop count is an eight bit unsigned integer, which is incremented by one by each peering edge device in the TSP network 20 that forwards the packet. The VPN identification number is a four (or multiple of four) octet identifier associated with each VPN.

At step s218, the multicast IPv6 packet, including the encapsulated LAN frame and the VPN identification number, is then broadcast through the TSP network 20, resulting in the IPv6 packet being received by every potential egress line interface associated with a broadband access of the customer's VLAN VPN, including, for example, line interfaces 23a and 24a, at step s220. Only the line interface 23a which corresponds to the destination LAN 40 and/or the destination customer device 44 proceeds with the remaining steps of FIG. 2, for example, based on the MAC address of the destination customer device 44 to which the LAN frame was initially addressed.

When the mapping exists, as determined at step s212, the ingress line interface 22a encapsulates the LAN frame in a unicast IPv6 packet at step s232. The IPv6 packet has the TSP IPv6 address of the egress line interface (e.g., the line interface 23a) as the destination address and the TSP IPv6 address of the ingress line interface 22a as the source address. At step s234, the previously assigned VPN identification number is added to the header of the IPv6 packet in order to provide security for the VPN, as described above with respect to multicasting IPv6 packets. The unicast IPv6 packet, including the encapsulated LAN frame and the VPN identification number, is then transmitted through the TSP network 20 using the TSP IPv6 address of the egress line interface 23a, which receives the unicast IPv6 packet at step s220.

At step s222, the virtual learning bridge of the egress line interface 23a authenticates the IPv6 packet. For example, the egress line interface 23a first determines whether the VPN identification number of the received IPv6 packet matches the assigned customer VPN identification number. Any IPv6 packets that do not include a matching VPN identification number are discarded at step s238. In an embodiment of the invention, the destination customer edge device 41 determines whether the VPN identification number of the received IPv6 packet matches the assigned VPN identification number and discards unauthorized packets, accordingly. In another embodiment, authorization of the VPN identification numbers can be disabled in the TSP network 20 and/or the LAN 40 to enable interworking among a greater number of VPNs.

When the VPN identification number of the IPv6 packet matches the customer VPN identification number, the virtual learning bridge of the egress line interface 23a decapsulates the IPv6 packet and extracts the LAN frame at step s224. The LAN frame is forwarded to the destination LAN 40, through the broadband access link 42 at step s226.

Meanwhile, at step s228, the virtual learning bridge of the egress line interface 23a learns and caches the mapping of identification information, such as an Ethernet MAC address and/or the VLAN identification number of the originating customer device 14, to the TSP-IPv6 address of the ingress line interface 22a, from which the frame was sent. Therefore, when the egress line interface 23 receives subsequent LAN frames from the customer device 44 and/or the LAN 40, destined for the customer device 14 and/or the LAN 10, the egress line interface 23a merely encapsulates the LAN frame in an IPv6 packet and unicasts the IPv6 packet to the ingress line interface 22a, using the mapping.

Because the majority of Ethernet data traffic, for example, is bi-directional, eventually all of the line interfaces 22a, 23a and 24a will learn and cache the mapping of the identification information of all active customer devices 14, 44 and 54 in all of the LANs 10, 40 and 50 to the TSP IPv6 addresses of the corresponding line interfaces 22a, 23a and 24a. Accordingly, the line interfaces will be able to encapsulate the LAN frames in unicast IPv6 packets containing the specific TSP-IPv6 address of the desired line interface as the destination address, instead of a multicast IPv6 packet having the customer IPv6 multicast address as the destination address. In other words, as the mapping among line interfaces 22a, 23a and 24a and customer devices 14, 44 and 54 is learned and cached, the process increasingly follows the unicast steps s232, s234 and s236 of FIG. 2, as opposed to the multicast steps s214, s216 and s218, significantly increasing the efficiency of the TSP network 20.

An alternative embodiment of the present invention enables interworking among different VLAN VPNs (i.e., extra-net VPNs). The line interfaces 22a, 23a and 24a are configured to recognize and authenticate multiple, previously assigned VPN identification numbers, corresponding to the interworking VPNs, instead of a single VPN identification number corresponding to one customer. Accordingly, any IPv6 packet that arrives at the line interfaces 22a, 23a and 24a having a VPN identification number matching any of the VPN identification numbers on the list is authenticated and forwarded to the appropriate LAN 10, 40 and 50 and/or customer device 14, 44 and 54. For example, the allowed VPN identification number list may include all of the VPN identification numbers of pre-arranged peering business customers.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., IPv4, IPv6, TCP, UDP, MPLS) and public telephone networks (ATM, DSL) represent examples of the state of the art. Such standards are periodically superseded by faster or more efficient equivalents having essentially the same functions. Accordingly, replacement standards and protocols having the same functions are considered equivalents.

What is claimed is:

1. An apparatus comprising:
at least one circuit configured to receive an upper layer packet that includes data from a source device, a virtual private network (VPN) identification, a destination address, and a destination option type, wherein the VPN identification is a unique identification number assigned to the source device for marking the upper layer packet as belonging to a VPN to which the source device and a destination device belong, wherein the destination option type includes a value indicating to discard the upper layer packet on a condition that the apparatus does not recognize the destination option type;
the at least one circuit configured to authenticate the upper layer packet by comparing the VPN identification of the received upper layer packet to a customer VPN identification; and
the at least one circuit configured to determine whether the apparatus recognizes the destination option type of the upper layer packet, wherein the at least one circuit is configured to discard the upper layer packet on a condition that the apparatus does not recognize the destination option type, and wherein the at least one circuit is configured to decapsulate the upper layer packet into a lower layer packet and transmit the decapsulated packet to a destination on a condition that the apparatus recognizes the destination option type.

2. The apparatus of claim 1, wherein the apparatus is associated with a service provider.

3. The apparatus of claim 2, wherein the at least one circuit is configured to receive the upper layer packet from an ingress edge device and wherein the ingress edge device is associated with the service provider.

4. The apparatus of claim 1, wherein the VPN identification comprises at least four bytes.

5. The apparatus of claim 1, wherein the VPN identification includes a VPN hop count.

6. The apparatus of claim 1, wherein the apparatus is a router.

7. The apparatus of claim 1, wherein the apparatus is a gateway.

8. The apparatus of claim 1, wherein the upper layer packet is sent to multicast addresses determined by a service provider network and includes an address of the apparatus on a condition that the destination is not mapped specifically to the apparatus.

9. The apparatus of claim 1, wherein the upper layer packet is sent to an address of the apparatus but not at other apparatus of a service provider network that the apparatus is associated with on a condition that the destination is mapped specifically to the apparatus.

10. A method, implemented by an apparatus, comprising:
receiving an upper layer packet that includes data from a source device, a virtual private network (VPN) identification, a destination address, and a destination option type, wherein the VPN identification is a unique identification number assigned to the source device for marking the upper layer packet as belonging to a VPN to which the source device and a destination device belong, wherein the destination option type includes a value indicating to discard the upper layer packet on a condition that the apparatus does not recognize the destination option type;
authenticating the upper layer packet by comparing the VPN identification of the received upper layer packet to a customer VPN identification; and
determining whether the apparatus recognizes the destination option type of the upper layer packet, wherein the determining further comprises:
discarding the upper layer packet on a condition that the apparatus does not recognize the destination option type; and
decapsulating the upper layer packet into a lower layer packet and transmitting the decapsulated packet to a destination on a condition that the apparatus recognizes the destination option type.

11. The method of claim 10, wherein the apparatus is associated with a service provider.

12. The method of claim 11, wherein the upper layer packet is received from an ingress edge device and wherein the ingress edge device is associated with the service provider.

13. The method of claim 10, wherein the VPN identification comprises at least four bytes.

14. The method of claim 10, wherein the VPN identification includes a VPN hop count.

15. The method of claim 10, wherein the apparatus is a router.

16. The method of claim 10, wherein the apparatus is a gateway.

17. The method of claim 10, wherein the upper layer packet is sent to multicast addresses determined by a service provider network and includes an address of the apparatus on a condition that the destination is not mapped specifically to the apparatus.

18. The method of claim 10, wherein the upper layer packet is sent to an address of the apparatus but not at other apparatus of a service provider network that the apparatus is associated with on a condition that the destination is mapped specifically to the apparatus.

19. A non-transitory computer-readable storage medium with stored instructions, wherein the stored instructions are executable by a processor of a computer, the instructions comprising:
instructions to receive an upper layer packet that includes data from a source device, a virtual private network (VPN) identification, a destination address, and a destination option type, wherein the VPN identification is a unique identification number assigned to the source device for marking the upper layer packet as belonging to a VPN to which the source device and a destination device belong, wherein the destination option type includes a value indicating to discard the upper layer packet on a condition that the apparatus does not recognize the destination option type;

instructions to authenticate the upper layer packet by comparing the VPN identification of the received upper layer packet to a customer VPN identification;

instructions to determine whether the processor recognizes the destination option type of the upper layer packet;

instructions to discard the upper layer packet on a condition that the processor does not recognize the destination option type; and instructions to decapsulate the upper layer packet into a lower layer packet and transmit the decapsulated packet to a destination on a condition that the processor recognizes the destination option type.

* * * * *